United States Patent
Zaragoza (10) Patent No.: US 7,827,172 B2
(45) Date of Patent: Nov. 2, 2010

(54) "QUERY-LOG MATCH" RELEVANCE FEATURES (75) Inventor: Hugo Zaragoza, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 303 days.

(21) Appl. No.: 11/724,559

(22) Filed: Mar. 14, 2007

(65) Prior Publication Data

US 2008/0228750 A1    Sep. 18, 2008

(51) Int. Cl.
    *G06F 7/00* (2006.01)
(52) U.S. Cl. .................. 707/723; 707/728
(58) Field of Classification Search ............ 707/3, 707/728, 723
    See application file for complete search history.

(56) References Cited

U.S. PATENT DOCUMENTS

| 7,136,845 | B2 * | 11/2006 | Chandrasekar et al. ......... 707/3 |
| 7,505,964 | B2 * | 3/2009 | Tong et al. ...................... 707/3 |
| 2004/0199498 | A1 * | 10/2004 | Kapur et al. .................... 707/3 |
| 2005/0267871 | A1 * | 12/2005 | Marchisio et al. ............... 707/3 |
| 2006/0161534 | A1 * | 7/2006 | Carson et al. ................... 707/3 |
| 2007/0038615 | A1 * | 2/2007 | Vadon et al. .................... 707/4 |
| 2007/0192293 | A1 * | 8/2007 | Swen ............................ 707/3 |
| 2007/0214131 | A1 * | 9/2007 | Cucerzan et al. ............... 707/5 |
| 2008/0010269 | A1 * | 1/2008 | Parikh .......................... 707/5 |
| 2008/0114721 | A1 * | 5/2008 | Jones et al. .................... 707/2 |

* cited by examiner

*Primary Examiner*—Apu M Mofiz
*Assistant Examiner*—Cindy Nguyen
(74) *Attorney, Agent, or Firm*—Hickman Palermo Truong & Becker LLP; Daniel D. Ledesma (57) ABSTRACT

Techniques for generating features that are used to rank documents in a search results page are provided. A query is received and may be modified before being compared to queries in a query log of previously-issued queries. The comparisons may be made in a variety of ways. The comparisons may allow query terms to be ordered and terms to be inserted. Relevance features are generated from the results of the comparisons. The documents that are referenced in a search results page (generated as a result of the query) are ranked based on the generated relevance features.

48 Claims, 3 Drawing Sheets

"QUERY-LOG MATCH" RELEVANCE FEATURES

FIELD OF THE INVENTION

The present invention relates generally to queries, and more particularly to generating new types of relevance features based on comparisons between a received query and a queries in a query log.

BACKGROUND

Search engines are software architectures that allow humans to search and find documents in large collections. Specific examples of search engines include Web search engines (which search documents in the WWW), corporate search engines (which search documents within corporate collections), and email search clients (where an email or contact information for an individual or organization may be considered a document).

In order to find relevant documents, a search engine represents documents and search queries by a number of relevance features which are combined into a document relevance score. When a user types in a query string, the search engine pre-selects a number of candidate documents from a document index and then compares all these documents to the query to determine their relevance. In order to carry out this comparison, a number of relevance features are extracted for each document and are then combined by a ranking function to produce a single relevance score. Subsequently, the search engine may order all document references by their (decreasing) relevance score, generate a search results page of the ordered references, and present the search results page to the user.

The value or worth of a search engine is determined partly by the quality of the relevance features used in the search engine and partly by the quality of the combination of these features. (There may be many other factors that determine the value or worth of a search engine.) There are several families of relevance features today, such as document frequency features, hyper-link graph features, and positional match features. What is needed are new relevance features to improve the ranking of document references in a search results page.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques for generating relevance features are provided. These relevance features are constructed by analyzing the "matches" of a user query with respect to a large set of existing known queries, referred to hereinafter as a "query log". Such large collections of queries can be obtained, e.g., from Web search engine query logs, corporate search engine query logs, and email client query logs.

The query is used to select a set of documents, only a few of which may be referenced in a search results page. The relevance features are then used to rank the documents. The ranking of a document determines where in the search results page the document will be identified relative to the other documents identified in the search results page.

As referred to hereinafter, a "document" is any logical unit of searchable information. Therefore, examples of documents include, but are not limited to, web pages, emails, and references to books and videos in a library or online store. Therefore, a document may be the item that a user desires to examine (as in the case of web pages and emails) or a document may be information concerning where to find the desired item (as in the case of a reference to the location of a book in a library) or how to obtain the desired item (as in the case of a reference to how to order a book online).

As referred to hereinafter, a "query" comprises a sequence of one or more terms, where each term is a string of one or more characters that are not separated by space. Therefore, "j9*" is an example of a possible term. However, examples of terms used in typical Web queries include, but are not limited to, words from any known language, a price, a product number, and an ISBN number.

As referred to hereinafter, a "search result" is a document title and/or a document highlight, and a rank for the result (to enable a result to be ordered relative to other results of a search). A "search results page" displays multiple search results based on a particular query, and may include links to additional search results.

As referred to hereinafter, a "user click" is an indication that the user selects a particular search result, and in which position relative to the other clicks of the user for that query. For example, a user (a) issues a query obtaining a search result page, (b) clicks on the third search result to view the corresponding document, (c) returns to the search results page, and (d) clicks on the first search result. As a result of the above sequence of user actions, two user clicks are obtained: in first position a click pointing to the third search result and in second position a click pointing to the first search result.

Example Architecture

Figure 1:
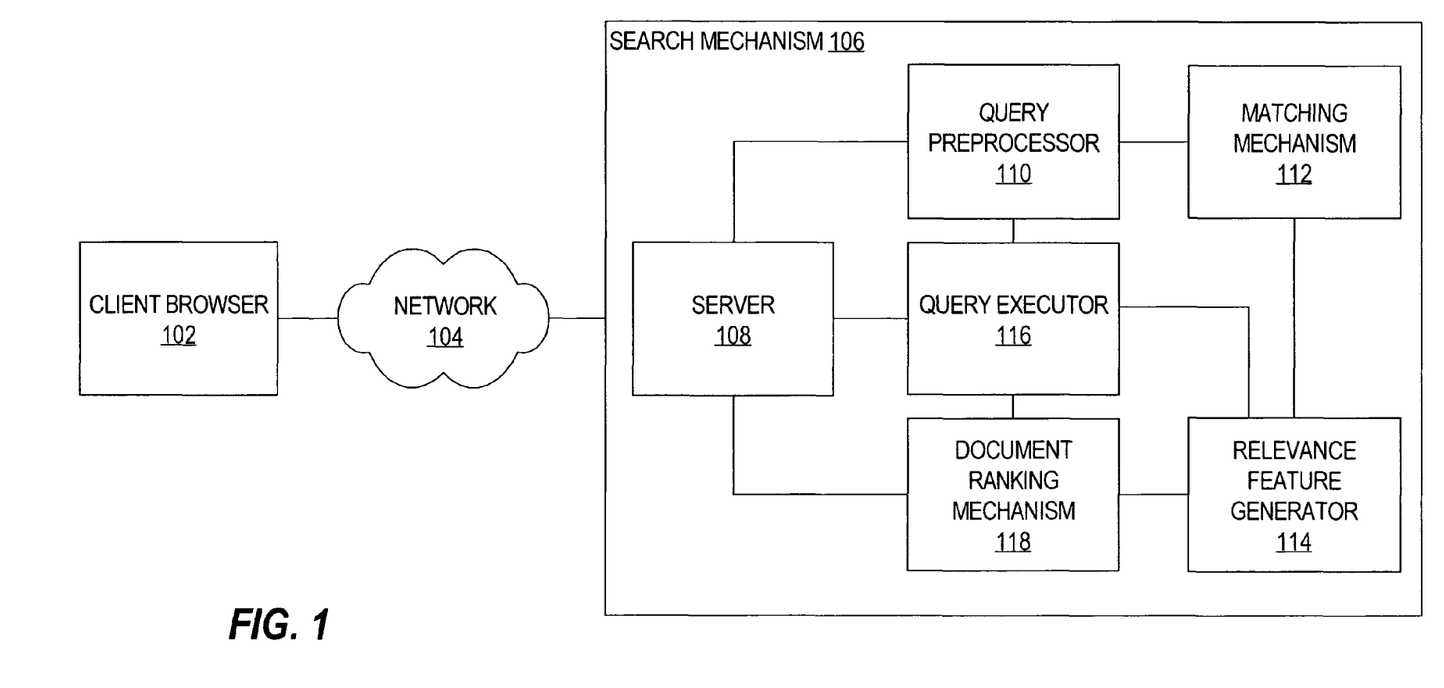
FIG. 1 is a block diagram that illustrates an example architecture for processing a search query and generating relevance features, according to an embodiment of the invention.

FIG. 1 is a block diagram that illustrates an example architecture for processing a search query and generating relevance features, according to an embodiment of the invention. A user instructs a client browser 102 (e.g., Mozilla Firefox) to submit a query to a search mechanism 106 via a network 104.

Network 104 may be implemented by any medium or mechanism that provides for the exchange of data between various nodes in the network. Examples of network 104 include, without limitation, a network such as a Local Area Network (LAN), Wide Area Network (WAN), Ethernet or the Internet, or one or more terrestrial, satellite, or wireless links. Network 104 may include a combination of networks such as those described. Network 104 may transmit data according to Transmission Control Protocol (TCP) and Internet Protocol (IP).

Search Mechanism

Search mechanism 106 comprises multiple components that are illustrated in block form. However, each block should not necessarily be interpreted to be a separate computing device. Search mechanism 106 may comprise one or more devices and each component may represent, for example, a software module or thread executing on one or more of those devices.

In the illustrated embodiment, search mechanism 106 comprises: (A) a server 108 for receiving a query from client browser; (B) a query preprocessor 110 for processing the query before relevance features are generated; (C) a matching mechanism 112 for comparing the query (or preprocessed query) to queries in a query log; (D) a relevance feature generator 114 for generating one or more relevance features based on the values produced from matching mechanism 112; (E) a query executor 116 for selecting multiple documents based on the query; and (F) a document ranking mechanism 118 for ranking the selected documents based on the generated relevance features. The document rank of a document is used to order a document reference, with respect to the other document references, when they are displayed in a search results page. Server 108 sends the search results page to client browser 102, via network 104, to be displayed.

Query Preprocessor

As FIG. 1 illustrates, search mechanism 106 includes query preprocessor 110. However, in one embodiment, search mechanism 106 does not include a query preprocessor 110. In other words, query preprocessor 110 is not required for various embodiments of the invention.

According to an embodiment of the invention, query preprocessor 110 executes one or more methods to process a received query before the query is sent to matching mechanism 112, which includes a set of "matchers", some of which may be "term matchers". A "matcher" is a function that compares two strings and returns a result. A "term matcher" operates on term strings. A term string is a sequence of terms separated by spaces. In other words, term matchers do not necessarily consider only individual string characters of a query or the entire query; rather, term matchers operate at the term level. For example, the query "cheap pizza" is interpreted by a term matcher as a sequence of two terms.

To obtain a term string from a sentence or a query q, q is preprocessed. Query preprocessor 110 may execute any number of different preprocessing methods against query q; three such methods are described below. The three methods are performed by preprocessors labeled p0, p1, and p2.

Preprocessor p0 identifies the spaces in a query q and splits query q into a sequence of terms. A "space" in a query refers not only to a single space, but also to any number of contiguous spaces. For example, if query q is "cheap pizza", then, although there are technically three spaces separating "cheap" from "pizza", the three spaces are considered a single space. Thus, if query q has two spaces, then there will be a sequence of three terms. Similarly, if query q has three spaces, then there will be a sequence of four terms.

Preprocessor p1 identifies and removes any non-alphanumeric characters and replaces each non-alphanumeric character with a space. The spaces are then used to split query q into a sequence of terms. In one embodiment, p1(q) removes any non-alphanumeric characters in a query q and replaces each one with a space to generate a query q'; then, p0(q') is implemented.

Preprocessor p2 identifies the spaces in query q and splits query q into a sequence of terms. Preprocessor p2 also converts any uppercase letters to their corresponding lowercase letters and stems any appropriate terms. Any type of stemming may be performed, such as removing any "s", "ing", and "ed" from the end of terms without significantly changing the meaning of the terms. For example, the query "FIFA rules", after being processed by p2, would become terms "fifa" (where "fifa" is the lowercase form of "FIFA") and "rule" (where "s" is removed from "rules"). In a related embodiment, p2 only "lowercases" and stems a query q' after p0 is executed on query q to generate q'.

Matching Mechanism

According to an embodiment of the invention, after query preprocessor 110 generates a sequence of terms based on a query, query preprocessor 110 sends the sequence of terms to matching mechanism 112 to be matched.

A query, or a sequence of one or more terms that is generated based on the query, is "matched" or compared against queries in a query log. A query log is a collection of queries. Each query in a query log may be associated with search results (for example the results produced by a search engine for that query). Each query in a query log may also (or alternatively) be associated with any references to documents that were selected (i.e., clicked), in the search results page, by the user that issued the query.

The queries that make up the query log may be come from any source, not just the repository that stores queries that are received at search mechanism 106. One or more queries in the query log may be modified forms of the original queries that were issued by end users. Additionally or alternatively, the query log comprises sentences (or snippets) that were extracted from a collection of documents.

In one embodiment, the query log also includes strings that are not previously issued queries. For example, strings in the query log may be document titles and sentences or snippets from the actual documents (e.g., web pages).

In one embodiment, one or more queries in the query log are associated with a corresponding weight. The weight may reflect numerous factors, such as frequency, recent popularity, and authority. For example, if a query is recently popular (e.g., frequency Y within the previous X days), then its corresponding weight may be relatively high, such as 0.96 (on a scale of 0 to 1). Conversely, if the query has a low frequency (i.e., rarely issued), then the corresponding weight may be relatively low, such as 0.02. As an example of another factor other than popularity, if a query is associated with pornography, then the corresponding weight may be set to be relatively low, such as 0.1, despite the query's relative popularity.

The set of queries in a query log S may be described as:

$$S:=\{(s1, r1, c1) \ldots, (sN, rN, cN)\}$$

where s is a query in S, r is the sequence of search results associated with query s, and c is the sequence of clicks (i.e., references to documents displayed in a search results page that were selected by one or more users that issued the query) associated with query s.

Matchers

According to an embodiment of the invention, a "matcher" is a function that compares two queries and returns a number, e.g., between 0 and 1, where 1 indicates an exact match and non-zero values indicate at least a partial match. However, any other values may be used to indicate a match, no match, and a partial match.

There are at least two classes (or versions) of matchers—a term matcher (described above) and a string matcher that compares two (e.g., preprocessed) queries as whole strings. The result of using a term matcher on a preprocessed query q and a preprocessed query s in query log S may or may not be the same as the result of using a corresponding string matcher on query q and query s. For example, if a query q is "hardware supply", a query s in query log S is "hardware supply", and a matcher m determines if q and s are equal, a term version of m will return a 1, while a string version of m will return a 0 due to the extra space at the beginning of q.

Many matchers may be devised and all may be used to derive relevance features. Examples of matchers include the following:

mC(q, s):=1 if q=s or q is a term substring of s, 0 otherwise.
mF(q, s):=1 if q=s, 0 otherwise.
mB(q, s):=1 if s begins with q and q≠s, 0 otherwise.
mE(q, s):=1 if s ends with q and q≠s, 0 otherwise.
mM(q, s):=1 if s contains q, q≠s and s neither begins nor ends with q.

where q is the original (or preprocessed) query and s is a query in query log S. C, F, B, E and M respectively stand for complete, full, begin, end, and middle.

If either of q and s is preprocessed prior to being matched, then the notation of each matcher above is slightly different. For example, if both q and s are preprocessed using p1, then mC(q, s) becomes mC(p1(q), p1(s)).

Query Weight Functions

A query weight function is a function that takes a query s and query log S as input and outputs a weight, for query s, with respect to a property in query log S. Many query weight functions, other than the functions described below, may be defined.

w0(s):=1 (no weighting).
w1(s):=number of search results for the query s.
w2(s):=number of search results which contain s as a substring of the search result title.
w3(s):=number of search results which contain s as a substring of the search result highlight.
w4(s):=number of search results clicked for the query s.
w5(s):=number of search results clicked which contain s as a substring of the search result title.
w6(s):=number of search results clicked which contain s as a substring of the search result highlight.

Query Log Scores

A query log score (QLS) of a query q may be computed by using a matcher and a query weight function to compare query q to each query s in a query log. In one embodiment, QLS is described as:

$$qls(q, m, w) := \sum_{i}^{N} [m(q, s_i) * w(s_i)]$$

where q is the received query, s is a query in query log, m is a matcher, and w is a query weight function applied to s. Therefore, if there are N matchers, then there may be at least N QLS functions.

The result of a QLS function (referred to hereinafter as a QLS value) may indicate the popularity of a query q, whereas the QLS value of another QLS function may indicate the (e.g., morphologic) variability of a query q. Any function of one or more QLS values may be used as a relevance feature. For example, given the matchers mF and mB above, the quantity:

$$f(q):=1-qls(q,mF,w0)/qls(q,mB,w0)$$

indicates what proportion of queries in query log S are completions of query q. Such a proportion may be used as a relevance feature.

Order of Terms

When matching two term strings (e.g., q and s, or p0(q) and p0(s)), the order of the terms in the term strings may or may not be important. For example, if a query q is "barcelona pizza" and a previously-issued query s is "pizza barcelona", then mC and mF will return 0 if ordering is not allowed. However, if q is ordered, then q may be changed to "pizza barcelona", which is equal to s. In that case, mC and mF will return 1. When describing different relevance features, ordering is denoted as "o1" for no ordering and "o0" for ordering. For example, mCo1 indicates that when matcher mC is executed, the terms in term strings q and s are ordered.

Term Insertion

When matching two sequences of terms (i.e., term strings q and q'), it may also be important to allow or disallow insertions. For example if a query q is "yahoo maps" and a previously-issued query s is "yahoo barcelona maps", then mC (i.e., is q a substring of s?) will return 0 if insertion is not allowed. However, if insertion is allowed, then mC will return 1. To allow insertions does not necessarily involve inserting terms into query q, nor deleting terms from query s. The algorithm may simply account for situations, such as the example given above, where inserting one or more terms between terms in query q would make query q a subset of query s. When describing different relevance features, insertion is denoted as "i0" for no insertion and "i1" for insertion. For example, mBi0 indicates that when matcher mB is executed, insertion is not allowed.

Number of Matchers

The number of possible matchers significantly increases if ordering and insertions are considered. Based only on the C, F, B, E, and M matchers defined above {5}, the possibility of ordering {2}, the possibility of insertions {2}, and the three preprocessing methods described above {3}, there are 60 matchers in total. Each matcher may be denoted by concatenating the descriptors. For example, "mFo0i1p1" indicates that: (1) p1 is used as the processing method on the received query (and possibly a query s in query log S); (2) mF does not order the term strings of the preprocessed query before q and s are matched; and (3) mF allows insertions into preprocessed query q before q and s are matched.

Relevance Feature Generator

According to an embodiment of the invention, the results of one or more matchers that were generated at matching mechanism 112 are sent to relevance feature generator 114. In a related embodiment, relevance feature generator 114 includes one or more matchers, thus precluding the need for matching mechanism 112. Therefore, a query q may be sent directly from server 108 (or query preprocessor 110) to relevance feature generator 114.

QLS values may be used directly as relevance features or as components to define new relevance features. Some QLS ratios are candidates for relevance features because they represent probabilities of interesting events.

For example, $$qls(q,mF,w0)/qls(q,mC,w0)$$

may be interpreted as the probability that a query q exactly matches a query in a set of all queries that query q at least partially matches. This probability provides an indication of how "complete" or "specific" query q is with respect to queries in the query log. For example, if the query "Barcelona" were used in calculating qls(q, mF, w0)/qls(q, mC, w0), then the resulting probability would most likely be low since users typically complete the query with other terms. However, the query "Barcelona good Italian restaurants" would lead to a high probability since users would probably not add to that query much more.

To simplify the notation, mA//mB denotes: qls(q, mA, w)/qls(q, mB, w), for each w, o, i, and p choice. Note that the specific w/o/i/p values are not specified in this notation because all are valid as long as the same are used on both matchers. Furthermore, the particular query weighting function is not indicated because each query weighting function may result in a meaningful feature. Therefore, each mA//mB combination represents 2×2×3×7=84 possible different formulas.

The following relevance features are considered interesting and are grouped according to type:

Type I: mF//mC, mB//mC, mE//mC, mM//mC, for all o/i/p values.

Type II: mCo1//mCo0, mFo1//mFo0, mBo1//mBo0, mEo1//mEo0, mMo1//mMo0, for all i/p values.

Type III: mCi1//mCi0, mFi1//mFi0, mBi1//mBi0, mEi1//mEi0, mMi1//mMi0, for all o/p values.

Thus, there are 4×12×7=336 relevance features of Type I, 5×6×7=210 relevance features of Type II, and 5×6×7=210 relevance features of Type III.

Relevance features of Type I generally indicate the ratio of query frequency of a query q to queries s in a query log that contain q.

Relevance features of Type II generally indicate the ratio of query frequency of a query q to the re-orderings of q in a query log.

Relevance features of Type III generally indicate the ratio of query frequency of a query q to close re-writes of q in a query log.

Some ratios of query weighting functions may be used as relevance features and are also considered interesting. As used hereinafter, wA//wB denotes qls(q, m, wA)/qls(q, m, wB) for each mb/o/i/p choice. Therefore each wA//wB combination represents 5×2×2×3=60 relevance formulas. Based on some of these ratios, the following relevance features are grouped according to type:

Type IV: w2//w1, w3//w1, w4//w1, w5//w1, w6//w1
Type V: w4//w1, w5//w2, and w6//w3

Thus, there are 5×60=300 relevance features of Type IV and 3×60=180 relevance features of Type V.

Relevance features of Type V indicate, respectively, the probability that a query q (1) leads to clicks, (2) leads to click with the terms of query q in the title of the document, and (3) leads to clicks with the terms of query q in the snippet, summary, or highlight of a search result.

Other examples of types of relevance features include:
ratio of query frequency to queries contained by it, which may be written as, e.g., mF(s, q)//mC(s, q) instead of mF(q, s)//mC(q, s);
ratio of query frequency to its re-orderings of first k terms; and
ratio of query frequency to its re-orderings of last k terms.

QLS values and relevance features may be computed in a number of ways. For example, relevance features may be computed offline on a number of queries by sorting and linearly traversing query log S. Once computed, the relevance features may be cached for use. As another example, relevance features may be computed online for a particular query (i.e., as a result of receiving the particular query). The queries in query log S are indexed, e.g., by applying a document retrieval algorithm, such as an inverted index, a suffix tree or a suffix array, on the queries.

Query Executor

According to an embodiment of the invention, query executor 116, based on the original query or a modified form of the original query, selects a set of candidate documents that satisfy the query. Any technique for selecting a set of candidate documents may be used.

In one embodiment, query executor 116 selects the set of candidate documents as soon as search mechanism 106 receives the original query or the original query is modified in some way, e.g., by query preprocessor 110. Therefore, query executor 116 may operate independently of query preprocessor 110, matching mechanism 112, and relevance feature generator 114.

Document Ranking Mechanism

According to an embodiment of the invention, document ranking mechanism 118 receives the set of candidate documents from query executor 116. Document ranking mechanism 118 also receives the relevance features generated by relevance feature generator 114. Document ranking 118 ranks the documents in the set of candidate documents based on the relevance features. The document ranking of each document determines an order in which references to the documents are displayed in a search results page.

After the search results page is generated, search mechanism 106 sends (via network 104) the search results page to client browser 102.

Missing Values and Smoothing

Many queries may not have any matches in query log S, especially if S is small or if the query variability is very large (as it is typically with web search queries). If a query has little or no matches, then it may be desirable to smooth the count ratios. Since the count ratios are all probabilities, smoothing the count ratios may be done in a standard way applying standard smoothing techniques for binomial or multinomial probability distributions.

Search Query Example

Figure 2:
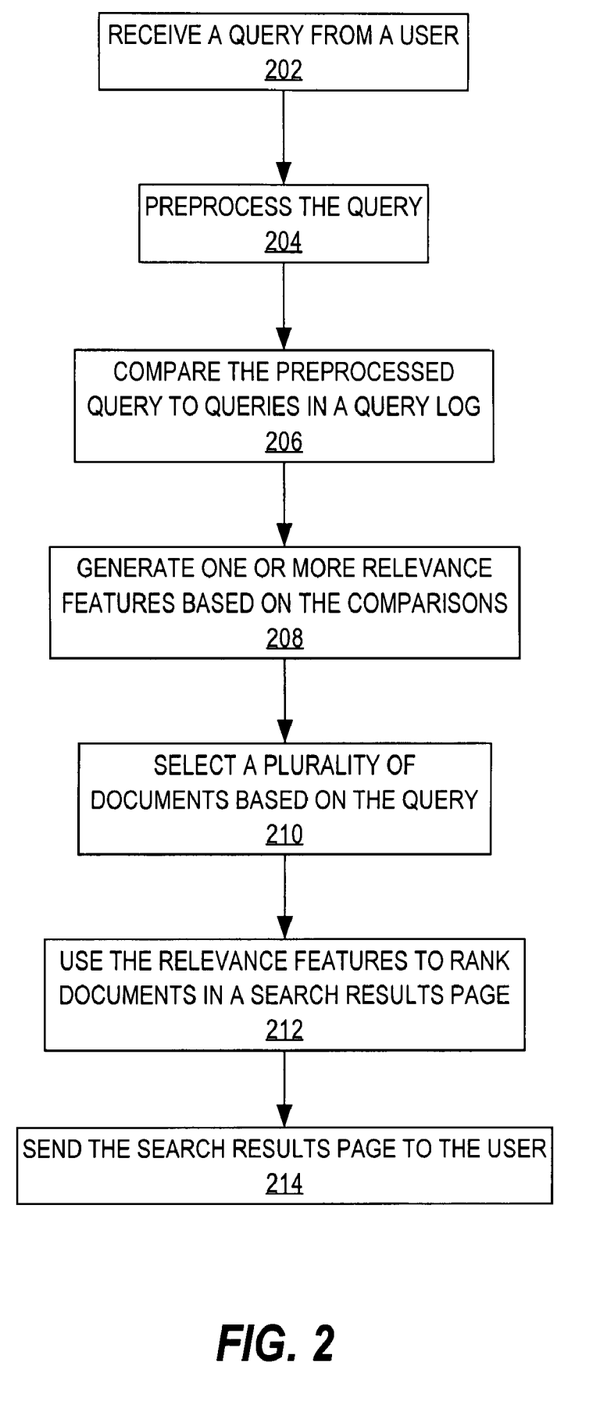
FIG. 2 is a flow diagram that illustrates how a search query is processed, according to an embodiment of the invention.

FIG. 2 is a flow diagram that illustrates how a search query is processed by search mechanism 106. Although the steps outlined in FIG. 2 are discussed in the context of particular components of search mechanism 106, other components of search mechanism 106 (shown or not shown) may perform the steps.

At step 202, search mechanism 106 receives a query (e.g., at server 108) from client browser 102 as a result of an instruction from a user. In this example, the query is "Garth   brooks" (where there are three spaces between "Garth" and "brooks").

At step 204, query preprocessor 110 processes the query by generating a sequence of terms from the query. Query preprocessor 110 removes the two spaces in the query and determines that the query "Garth brooks" comprises two terms—"Garth" and "brooks". Query preprocessor 110 also converts any uppercase letters of each term in the sequence of terms to lowercase. Therefore, the resulting sequence of terms is "garth" and "brooks". Query preprocessor 110 sends this sequence of terms to matching mechanism 112.

At step 206, matching mechanism 112 receives the sequence of terms and compares the sequence of terms against queries in a query log. The results of the comparisons are a set of one or more QLS values. Matching mechanism 112 sends the set of QLS values to relevance feature generator 114.

At step 208, relevance feature generator 114 generates, based on the set of QLS values, a set of one or more relevance features. Relevance feature generator 114 sends the set of relevance features to document ranking mechanism 118.

At step 210, query executor 116 executes the query "Garth brooks" to identify a set of relevant documents and sends references to the set of documents to document ranking mechanism 118.

At step 212, document ranking mechanism 118 uses the set of relevance features (and possibly many other features) to rank the set of documents identified by query executor 116. The document rank of each document in the list determines an order in which the references to the documents are displayed in a search results page.

At step 214, server 108 sends the search results page to client browser 102 to be displayed and viewed by the user.

Hardware Overview

Figure 3:
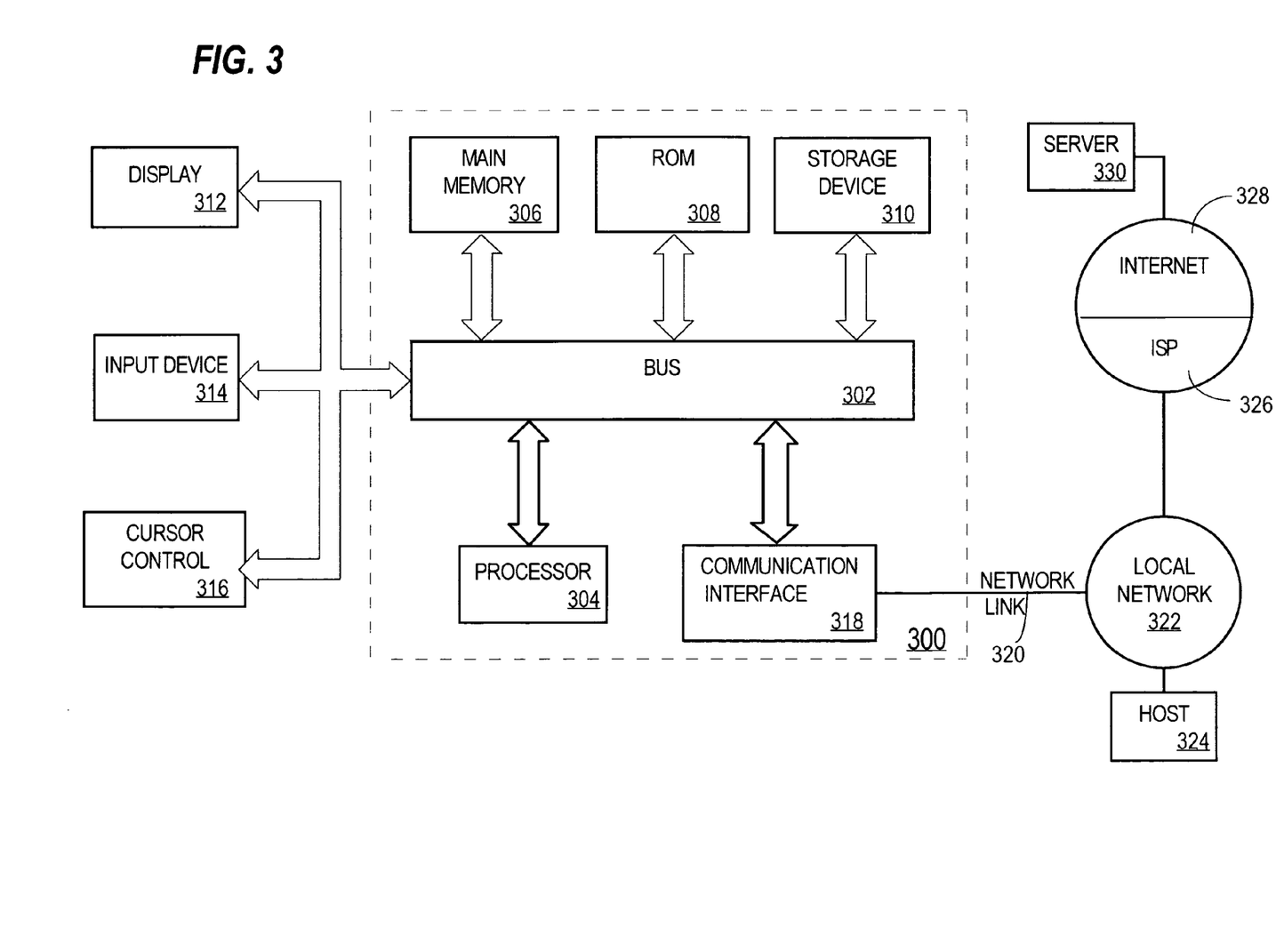
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
    receiving a particular query that comprises one or more terms;
    in response to receiving the particular query:
        making a first plurality of comparisons, wherein each comparison in the first plurality of comparisons is based on the particular query and a different query of a plurality of queries, wherein the number of the first plurality of comparisons and the number of the plurality of queries is the same;
        making a second plurality of comparisons, wherein each comparison in the second plurality of comparisons is based on the particular query and a different query of the plurality of queries;
        based on the first plurality of comparisons, generating a first numerical value;
        based on the second plurality of comparisons, generating a second numerical value that is different than the first numerical value;
        determining a ratio between the first numerical value and the second numerical value; and
        ranking documents in a document set based, at least in part, on the ratio;
    wherein the steps are performed by one or more computer systems.

2. The method of claim 1, wherein a document is a logical unit of searchable information.

3. The method of claim 2, further comprising generating a search results page that displays each document of the document set.

4. The method of claim 1, wherein each query in the plurality of queries was issued and received at a web search engine previous to the particular query.

5. The method of claim 1, wherein each query in the plurality of queries is a sentence extracted from a collection of documents.

6. The method of claim 1, wherein:
    each comparison, of the first plurality of comparisons, results in a value;
    making the first plurality of comparisons results in a plurality of values; and
    the method further comprising weighting one or more values of the plurality of values based on a weight associated with the corresponding different query.

7. The method of claim 6, wherein weighting one or more values of the plurality of values includes determining a number of search results that have been generated for the corresponding different query, wherein the corresponding different query is a substring of a title of each of the search results.

8. The method of claim 6, wherein weighting one or more values of the plurality of values includes determining a number of search results that have been generated for the corresponding different query, wherein the corresponding different query is a substring of a summary of each of the search results.

9. The method of claim 6, wherein weighting one or more values of the plurality of values includes determining a number of search results that were selected by user(s) that issued the corresponding different query.

10. The method of claim 6, wherein weighting one or more values of the plurality of values includes determining a number of search results that were selected by user(s) that issued the corresponding different query, wherein the corresponding different query is a substring of a title of each of the search results.

11. The method of claim 6, wherein weighting one or more values of the plurality of values includes determining a number of search results that were selected by user(s) that issued the corresponding different query, wherein the corresponding different query is a substring of a summary of each of the search results.

12. The method of claim 1, wherein one or more comparisons of the first plurality of comparisons include determinations of whether the particular query is a substring of said each query.

13. The method of claim 1, wherein one or more comparisons of the first plurality of comparisons include determinations of whether the particular query is equal to said each query.

14. The method of claim 1, wherein one or more comparisons of the first plurality of comparisons include determinations of whether (1) said each query begins with the particular query and (2) the particular query is not equal to said each query.

15. The method of claim 1, wherein one or more comparisons of the first plurality of comparisons include determinations of whether (1) said each query ends with the particular query and (2) the particular query is not equal to said each query.

16. The method of claim 1, wherein one or more comparisons of the first plurality of comparisons include determinations of whether (1) said each query contains the particular query, (2) the particular query is not equal to said each query, (3) said each query does not begin with the particular query, and (4) said each query does not end with the particular query.

17. The method of claim 1, further comprising:
before making the first plurality of comparisons, ordering the terms of the particular query; and
before each comparison of the first plurality of comparisons, ordering the terms of the corresponding query, wherein each comparison of the first plurality of comparisons is between the ordered particular query and the ordered corresponding query.

18. The method of claim 1, further comprising:
before making the first plurality of comparisons, inserting one or more terms into the particular query, wherein each comparison of the first plurality of comparisons is made between the modified particular query and the corresponding query.

19. The method of claim 1, further comprising, before making the first plurality of comparisons, processing the particular query to generate a modified query, wherein each comparison of the first plurality of comparisons is based on the modified query and the corresponding query.

20. The method of claim 19, wherein processing the particular query includes at least one of:
if the particular query comprises a plurality of terms, then splitting the particular query into a sequence of terms based on spaces between each term in the plurality of terms;
removing any non-alphanumeric characters from the particular query;
converting any uppercase letters in the particular query to the corresponding lowercase letters; or
stemming one or more terms of the particular query.

21. A volatile or non-volatile machine-readable medium storing one or more sequences of instructions which, when executed by one or more processors, causes the one or more processors to perform the method recited in claim 1.

22. A volatile or non-volatile machine-readable medium storing one or more sequences of instructions which, when executed by one or more processors, causes the one or more processors to perform the method recited in claim 2.

23. A volatile or non-volatile machine-readable medium storing one or more sequences of instructions which, when executed by one or more processors, causes the one or more processors to perform the method recited in claim 3.

24. A volatile or non-volatile machine-readable medium storing one or more sequences of instructions which, when executed by one or more processors, causes the one or more processors to perform the method recited in claim 4.

25. A volatile or non-volatile machine-readable medium storing one or more sequences of instructions which, when executed by one or more processors, causes the one or more processors to perform the method recited in claim 5.

26. A volatile or non-volatile machine-readable medium storing one or more sequences of instructions which, when executed by one or more processors, causes the one or more processors to perform the method recited in claim 7.

27. A volatile or non-volatile machine-readable medium storing one or more sequences of instructions which, when executed by one or more processors, causes the one or more processors to perform the method recited in claim 8.

28. A volatile or non-volatile machine-readable medium storing one or more sequences of instructions which, when executed by one or more processors, causes the one or more processors to perform the method recited in claim 9.

29. A volatile or non-volatile machine-readable medium storing one or more sequences of instructions which, when executed by one or more processors, causes the one or more processors to perform the method recited in claim 10.

30. A volatile or non-volatile machine-readable medium storing one or more sequences of instructions which, when executed by one or more processors, causes the one or more processors to perform the method recited in claim 11.

31. A volatile or non-volatile machine-readable medium storing one or more sequences of instructions which, when executed by one or more processors, causes the one or more processors to perform the method recited in claim 12.

32. A volatile or non-volatile machine-readable medium storing one or more sequences of instructions which, when executed by one or more processors, causes the one or more processors to perform the method recited in claim 13.

33. A volatile or non-volatile machine-readable medium storing one or more sequences of instructions which, when executed by one or more processors, causes the one or more processors to perform the method recited in claim 14.

34. A volatile or non-volatile machine-readable medium storing one or more sequences of instructions which, when executed by one or more processors, causes the one or more processors to perform the method recited in claim 15.

35. A volatile or non-volatile machine-readable medium storing one or more sequences of instructions which, when executed by one or more processors, causes the one or more processors to perform the method recited in claim 16.

36. A volatile or non-volatile machine-readable medium storing one or more sequences of instructions which, when executed by one or more processors, causes the one or more processors to perform the method recited in claim 17.

37. A volatile or non-volatile machine-readable medium storing one or more sequences of instructions which, when executed by one or more processors, causes the one or more processors to perform the method recited in claim 18.

38. A volatile or non-volatile machine-readable medium storing one or more sequences of instructions which, when executed by one or more processors, causes the one or more processors to perform the method recited in claim 19.

39. A volatile or non-volatile machine-readable medium storing one or more sequences of instructions which, when executed by one or more processors, causes the one or more processors to perform the method recited in claim 20.

40. The method of claim 1, wherein:
each comparison of the first plurality of comparisons is of a first type;

each comparison of the second plurality of comparisons is of a second type that is different than the first type; and making the second plurality of comparisons includes determining whether, for each query in the plurality of queries, the particular query is a substring of said each query.

41. The method of claim 17, wherein:

the first plurality of comparisons and the second plurality of comparisons are the same type of comparison; and for each comparison of the second plurality of comparisons, the terms of the particular query and the terms of the corresponding query are not ordered.

42. The method of claim 18, wherein:

the first plurality of comparisons and the second plurality of comparisons are the same type of comparison; and for each comparison of the second plurality of comparisons, no terms are inserted into the particular query.

43. The method of claim 6, wherein:

the first plurality of comparisons and the second plurality of comparisons are the same type of comparison;

making the second plurality of comparisons results in a second plurality of values; and the method further comprising:

weighting one or more values of the second plurality of values a manner that is different than the weighting of the one or more values of the first plurality of values.

44. A volatile or non-volatile machine-readable medium storing one or more sequences of instructions which, when executed by one or more processors, causes the one or more processors to perform the method recited in claim 40.

45. A volatile or non-volatile machine-readable medium storing one or more sequences of instructions which, when executed by one or more processors, causes the one or more processors to perform the method recited in claim 41.

46. A volatile or non-volatile machine-readable medium storing one or more sequences of instructions which, when executed by one or more processors, causes the one or more processors to perform the method recited in claim 42.

47. A volatile or non-volatile machine-readable medium storing one or more sequences of instructions which, when executed by one or more processors, causes the one or more processors to perform the method recited in claim 6.

48. A volatile or non-volatile machine-readable medium storing one or more sequences of instructions which, when executed by one or more processors, causes the one or more processors to perform the method recited in claim 43.

* * * * *